United States Patent [19]

Otomura et al.

[11] Patent Number: 4,929,430

[45] Date of Patent: May 29, 1990

[54] PROCESS FOR PREPARATION OF URANIUM TETRAFLUORIDE

[75] Inventors: Keiichiro Otomura, Kurayoshi; Takayuki Yamashita, Tomata; Setsuo Kanemitsu, Kurayoshi; Shigetoshi Nakabayashi, Naka; Hideo Miki, Yasu, all of Japan

[73] Assignee: Doryokuro Kakunenryo Kaihatsu Jigyodan, Tokyo, Japan

[21] Appl. No.: 365,115

[22] Filed: Jun. 12, 1989

[30] Foreign Application Priority Data

Jun. 23, 1988 [JP] Japan .................. 63-155780

[51] Int. Cl.$^5$ .................................. C01G 56/00
[52] U.S. Cl. ....................... 423/11; 423/259; 472/159
[58] Field of Search .................... 423/259, 11; 422/159

[56] References Cited

U.S. PATENT DOCUMENTS 4,062,923 12/1977 Takada et al. .................. 423/11

OTHER PUBLICATIONS

Perry & Chilton, Chemical Engineers' Handbook, 5th ed. 1973 pp. 19-26-19-30.

Primary Examiner—Stephen J. Lechert, Jr.
Assistant Examiner—Ngoclan T. Mai
Attorney, Agent, or Firm—Wenderoth, Lind & Ponack

[57] ABSTRACT

A process for preparing uranium tetrafluoride by reacting a uranous solution with a hydrofluoric acid solution in a fluorination precipitation tank is provided. A cylindrical inner tube having upper and lower ends opened is disposed in the tank in the longitudinal direction thereof. An agitator is arranged within the inner tube to generate a descending or ascending stream inside the inner tube and a ascending or descending stream outside the inner tube, thereby producing a circulation of reaction liquor in the tank. The uranous solution and the hydrofluoric acid solution are introduced into the tank from the upper part thereof and the produced uranium tetrafluoride crystals are withdrawn from the lower part of the tank together with a part of the reaction mother liquor. The amount of the hydrofluoric acid solution added to the uranous solution is adjusted so that the fluorine concentration in the reaction mother liquor in the tank is maintained at 2 to 4 g/l.

5 Claims, 1 Drawing Sheet 4,929,430

PROCESS FOR PREPARATION OF URANIUM TETRAFLUORIDE

BACKGROUND OF THE INVENTION

The present invention relates to an improvement in a so called wet process for preparing uranium tetrafluoride by reacting a uranous solution with a hydrofluoric acid solution.

Uranium tetrafluoride is important as an intermediate product in a process for preparing uranium hexafluoride or metallic uranium from a uranium concentrate (yellow cake).

In a wet process for the preparation of uranium tetrafluoride, a uranous solution and a hydrofluoric acid solution are introduced into a fluorination precipitation tank and these solutions are reacted with each other in the tank to form a precipitate of uranium tetrafluoride crystals.

As an example of the conventional wet process for the preparation of uranium tetrafluoride, there is a process proposed in U.S. Pat. No. 4,062,923. This prior art process is illustrated in FIG. 2. When a uranous solution and a hydrofluoric acid solution are supplied to the lower part of a fluorination precipitation tank 1 by means of a pump, crystals of uranium tetrafluoride are formed in the tank. The crystals are caused to rise by propeller-shaped agitation blades 2 disposed in the lower portion of the tank, and floated up by the action of a horizontal swirling stream induced by a plate-shaped agitation blade 3 disposed above the propeller-shaped agitation blades 2. During the floatation, the crystals grow and enlarge in a reaction zone 4 inside the tank 1, and finally precipitate. The precipitated uranium tetrafluoride crystals are discharged in the form of a slurry from a discharge pipe 5 arranged at the bottom of the tank, while the reaction mother liquor is separated from the crystal particles in a solid-liquid separation zone 6 located in the upper portion of the tank and is dischaged as a waste liquid from an overflow pipe 7. The liquid temperature in the tank is maintained within a range from about 90° C. to the boiling point of the liquid by a heater 8. By this prior art process, the uranium tetrafluoride crystals having a relatively large particle size can be continuously prepared.

According to the above-mentioned conventional process, in order to attain enlargement of the uranium tetrafluoride crystals, the crystals are gradually grown at a solution concentration of a low degree of supersaturation in the reaction zone 4 where the hydrofluoric acid solution contacts with the uranous solution. Accordingly, solutions each having a low concentration are supplied to the fluorination precipitation tank 1 so as to attain a low degree of supersaturation. Therefore the amount of the supplied liquid is increased as compared with the manufacturing capacity and the reaction time is prolonged so that the size of the fluorination precipitation tank has to be increased. As a result, the quantity of heat required for heating the liquid within the tank is increased and the amount of the waste liquid discharged from the tank increases. Thus, the above-mentioned conventional process is economically disadvantageous in various points.

Furthermore, in order to perform separation of crystal particles from the waste liquid at a high efficiency in the soild-liquid separation zone 6 disposed in the upper portion of the tank 1, it is necessary to control the agitation speed in the reaction zone 4, and since the size of the tank 1 is large, the liquid in the tank becomes heterogeneous and it is impossible to prevent formation of fine crystals reliably.

Moreover, since the solid concentration in the slurry discharged from the bottom portion of the fluorination precipitation tank 1 is high, clogging is often caused in the discharge pipe 5 and a problem arises with respect to the operation safety.

SUMMARY OF THE INVENTION

It is therefore a primary object of the present invention to provide an improved process for preparing uranium tetrafluoride in which reduction of the size of a fluorination precipitation tank and reduction of the quantity of resulting waste liquid can be attained.

Another object of the present invention is to provide an improved process for preparing uranium tetrafluoride in which clogging is not caused at the discharge of a slurry containing uranium tetrafluoride crystals.

Further object of the present invention is to provide an improved process for preparing uranium tetrafluoride in which uranium tetrafluoride crystals having a relatively large particle size and good particle properties can be obtained.

According to the present invention, these objects can be accomplished by an improvement in a process for preparing uranium tetrafluoride by reacting a uranous solution with a hydrofluoric acid solution in a fluorination precipitation tank.

The improvement is characterized in that (1) an inner tube of a cylindrical shape having upper and lower ends opened is arranged in the fluorination precipitation tank in the longitudinal direction thereof to partition the interior of the tank into a central portion and a peripheral portion, and an agitator is arranged in the inner tube to generate a descending or ascending stream in the central portion inside the inner tube and a ascending or descending stream in the peripheral portion outside the inner tube, whereby a reaction mother liquor in the tank is circulated to produce a completely mixed state; (2) the uranous solution and the hydrofluoric acid solution are introduced into the tank from the upper part thereof to react with each other to produce crystals of uranium tetrafluoride and the thus produced uranium tetrafluoride crystals are withdrawn from the lower part of the tank together with a part of the reaction mother liquor; and (3) the amount of the hydrofluoric acid solution added to the uranous solution is adjusted so that the fluorine concentration in the reaction mother liquor in the tank is maintained at 2 to 4 g/l.

In the process of the present invention, the reaction mother liquor i.e. a mixture of the solutions introduced into the tank, is circulated in the tank while forming a descending stream in the central portion inside the inner tube and an ascending stream in the peripheral portion outside the inner tube or forming an ascending stream in the central portion inside the inner tube and a descending stream in the peripheral portion outside the inner tube, and therefore the entire liquid in the tank is homogeneously and completely mixed. Therefore, even if the concentrations of the uranous solution and hydrofluoric acid solution are high, they are homogeneously dispersed in the reaction mother liquor just after the introduction and the phenomenon in which the particle size is reduced by formation of a large quantity of crystalline nuclei owing to local supersaturation is not caused. Accordingly, the concentration of each of the supplied uranous solution and hydrofluoric acid solution can be increased and hence the amount of the waste liquid discharged from the tank can be decreased.

Furthermore, crystal particles acting as crystallization nuclei and the starting uranous compound and hydrofluoric acid are homogeneously distributed in the tank so that crystallization takes place throughout the interior of the tank. For this reason and because the concentration of each of the starting solution can be increased, the crystals grow to a predetermined particle size in a relatively short residence time.

PREFERRED EMBODIMENT OF THE INVENTION

A preferred embodiment of the present invention will now be described with reference to the accompanying drawing.

Figure 1:
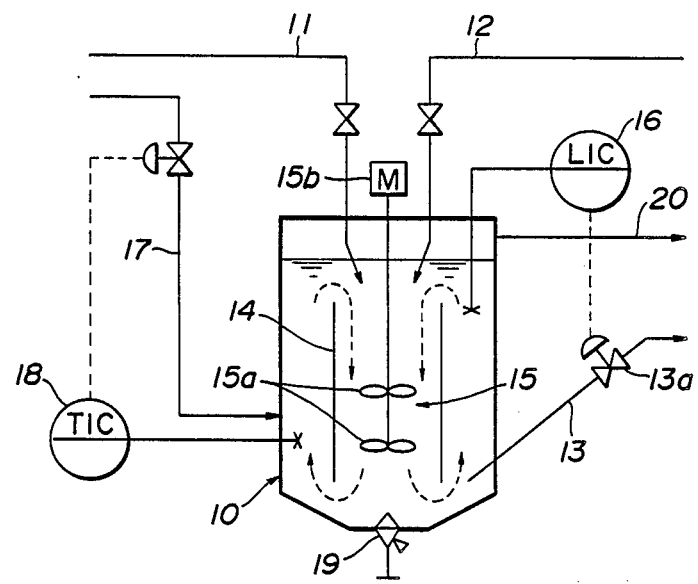
FIG. 1 is a schematic diagram illustrating an example of the apparatus for use in practicing the process of the present invention.

FIG. 1 illustrates an example of the apparatus for use in practicing the process of the present invention. A uranous solution injection pipe 11 and a hydrofluoric acid solution injection pipe 12 are connected to the upper portion of a fluorination precipitation tank 10, and a slurry withdrawal pipe 13 is extended from the lower portion of the tank 10 toward the outside of the tank.

A cylindrical inner tube 14 having upper and lower ends opened is arranged in the tank 10 in the longitudinal direction thereof to partition the interior of the tank into a central portion and a peripheral portion. The inner tube 14 is fixed at a predetermined position by a plurality of inner tube fixing arms (not shown) extended from the inner circumferential wall of the tank. An agitator 15 having propeller-shaped agitation blades 15a fixed to a shaft is arranged within the inner tube 14 and is rotated and driven by a motor 15b. The amount of slurry withdrawn from the slurry withdrawal pipe 13 is controlled by a level meter 16. The liquid temperature (the temperature of the reaction mother liquor) in the tank is maintained at a constant level by controlling the quantity of steam blown from a steam injection pipe 17 by a thermometer 18. In FIG. 1, reference numeral 19 represents a drain valve arranged in the bottom of the tank, and reference numeral 20 represents an overflow pipe arranged in the upper portion of the tank. The overflow pipe 20 is disposed to cause the slurry to overflow from the upper portion of the tank when a predetermined amount of the slurry cannot be withdrawn from the slurry withdrawal pipe 13 due to, for example, a trouble in the level meter 16.

In practicing the process of the present invention by using the apparatus shown in FIG. 1, uranous solution having a uranium concentration of at least 100 g/l, preferably at least 200 g/l, and a hydrofluoric acid solution having a concentration of 5 to 20% are injected into the upper portion of the reaction mother liquor in the fluorination precipitation tank 10. At this time, the temperature of the mother liquor is maintained at about 80° to about 95° C. The agitator 15 generates a descending stream within the inner tube 14 to thereby induce the circulation of the liquid as shown by arrows in FIG. 1. The agitator 15 is rotated at such a speed that the produced crystals are not deposited in the lower portion of the tank 10 but is sufficiently suspended and mixed in the mother liquor. If desired, an ascending stream may be generated within the inner tube 14 by changing the direction of rotation of the agitator 15.

The uranous compound and hydrofluoric acid injected into the reaction mother liquor which is completely and homogeneously mixed as a whole in the tank 10 are reacted with each other while being circulated inside and outside the inner tube 14 to crystallize uranium tetrafluoride, which is circulated for a residence time sufficient to attain a desired particle size. Then, the crystals are withdrawn through the slurry withdrawal pipe 13 together with a part of the reaction mother liquor. The withdrawal valve 13a of the slurry withdrawal pipe 13 cooperates with the level meter 16 and automatically opens to withdraw the slurry when the liquid level in the tank 10 exceeds a certain value by the injection of the solutions. By withdrawing the uranium tetrafluoride crystals together with the waste liquid (reaction mother liquor) without being separated in the tank, the slurry concentration is maintained to about 14 to about 15%, and there is no risk of clogging of the withdrawal pipe 13.

In the present invention, it is necessary that the amount of the hydrofluoric acid solution added to the uranous solution is controlled so that the fluorine concentration in the reaction mother liquor in the tank is 2 to 4 g/l. When the fluorine concentration in the mother liquor is too high as compared with the uranium concentration, the fluorine concentration in the waste liquid increases and hydrofluoric acid is consumed in a large quantity. When the fluorine concentration is too low, a large quantity of unreacted uranium is discharged in the waste liquid. When no good balance can be maintained between the two concentrations, the saturation concentration is reduced and the degree of supersaturation is relatively increased, with the result that a large quantity of nuclei are formed to cause generation of fine crystals. When the fluorine concentration in the reaction mother liquor is maintained within the above-mentioned range, crystal particles having a stable particle size and good particle properties can be obtained.

As explained hereinbefore, according to the present invention, since the reaction mother liquor in the tank is completely and homogeneously mixed, the uranous solution and the hydrofluoric acid solution are homogeneously dispersed in the reaction mother liquor just after the injection even when the concentration of each of the solutions injected into the tank is increased. Therefore, the formation of fine crystals caused by the generation of a large quantity of nuclei by the supersaturation can be prevented. Accordingly, the uranous solution having a relatively high uranium concentration of at least 100 g/l, preferably at least 200 g/l, can be injected into the tank and hence the amount of the liquid per unit treated quantity of uranium can be reduced and dimensions of the tank, pipes and pumps can be reduced.

The shorter the residence time in the tank, the smaller the volume of the tank, but the amount of discharge of unreacted liquid increases and the amount of formation of scale also increases. Therefore, the residence time is generally 0.5 to 3 hours and preferably about 1 hour.

EXAMPLE

Uranium tetrafluoride was prepared by using the apparatus shown in FIG. 1, which comprised a fluorination precipitation tank having a capacity of 0.5 m$^3$.

A uranous chloride solution having a uranium concentration of 200 g/l and a hydrofluoric acid solution having a concentration of 160 g/l were injected at the rates of 0.29 m$^3$/hr and 0.125 m$^3$/hr, respectively, into the tank to effect reaction. During the reaction, the fluorine concentration in the reaction mother liquor in the tank was maintained at 2.9 g/l. The liquid temperature in the tank was maintained at 90° C. and the agitation speed of the agitator was adjusted to 300 rpm. After te residence time were withdrawn in the form of a slurry together with a part of the waste liquid, and uranium tetrafluoride crystals having a mean praticles size of 86.3 $\mu$ and a flowability index of 91 were obtained.

COMPARATIVE EXAMPLE 1

The reaction was carried out in the same manner as described in the above-described Example except that the inner tube of the fluorination precipitation tank was removed. In the liquid in the tank, the ascending stream and the descending stream impinged against each other to form a turbulent flow so that the stream for suspending the crystals was decreased and the crystals were deposited in the bottom portion of the tank, with the result that further growth of the crystals was inhibited. Moreover, by the deposition of the crystals in the bottom portion of the tank, a trouble such as clogging of the slurry withdrawal pipe was liable to occur.

COMPARATIVE EXAMPLE 2

Uranium tetrafluoride was prepared in the same manner and under the same conditions as described in the above-described Example except that the fluorine concentration in the reaction mother liquor in the tank was maintained at 1.4 or 4.5 g/l. At each concentration, the particle size of the crystals was small and the filtration efficiency was poor.

As is understood from the foregoing, according to the present invention, the reaction mother liquor in the tank is completely and homogeneously mixed as a whole and therefore the following effects can be attained.

(a) The produced crystals of uranium tetrafluoride have, for example, a mean particles size of at least 80 $\mu$ and a flowability index of at least 85 and show good particle properties.

(b) The produced crystals of uranium tetrafluoride are not separated from the reaction mother liquor in the tank but is withdrawn from the lower portion of the tank together with a part of the mother liquor. Accordingly, any trouble such as clogging of the pipe at the time of the withdrawal is not caused. Furthermore, the withdrawal pipe can be closed by, for example, a simple automatic ball valve or the like, and hence automating of withdrawal of the slurry can be accomplished easily.

Figure 2:
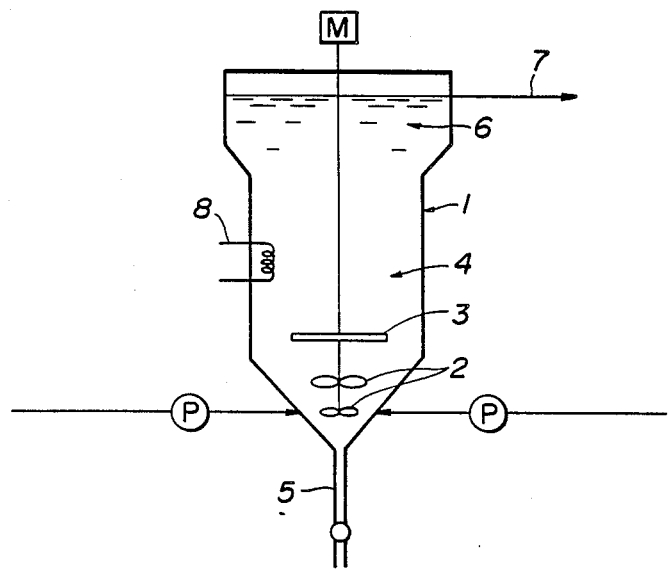
FIG. 2 is a schematic diagram illustrating the apparatus for use in practicing a prior art process.

(c) Since uranous solution and hydrofluoric acid solution each having a high concentration can be used, the size of the fluorination precipitation tank can be reduced to $\frac{1}{8}$ to 1/20 of that of the prior art apparatus (the appatatus shown in FIG. 2) having the same treatment capacity, and therefore the manufacturing cost and equipment area of the apparatus can be reduced and the consumption of steam for heating can be saved.

(d) The amount of the generated waste liquid is reduced to $\frac{1}{8}$ to $\frac{1}{4}$ of the waste liquid generated in the prior art apparatus, and the amount of a consumed reagent necessary for the waste liquid treatment and the necessary treatment capacity of the waste liquid treatment equipment can be reduced.

While the present invention has been described with respect to preferred embodiments, it should be apparent to those skilled in the art that numerous modifications may be made thereto without departing from the scope of the invention.

What is claimed is:

1. A process for preparing uranium tetrafluoride by reacting a uranous solution with a hydrofluoric acid solution in a fluorination precipitation tank, characterized in that (1) an inner tube of a cylindrical shape having upper and lower ends opened is arranged in said fluorination precipitation tank in the longitudinal direction thereof to partition the interior of said tank into a central portion and a peripheral portion, and an agitator is arranged in said inner tube to generate a descending or ascending stream in the central portion inside said inner tube and an ascending or descending stream in the peripheral portion outside said inner tube, whereby a reaction mother liquor in said tank is circulated to produce a completely mixed state; (2) the uranous solution and the hydrofluoric acid solution are introduced into said tank from the upper part thereof to react with each other to produce crystals of uranium tetrafluoride and the thus produced uranium tetrafluoride crystals are withdrawn from the lower part of said tank together with a part of the reaction mother liquor; and (3) the amount of the hydrofluoric acid solution added to the uranous solution is adjusted so that the concentration of fluorine in the reaction mother liquor in said tank is maintained at 2 to 4 g/l.

2. The process according to claim 1, wherein said agitator is rotated so as to generate a descending stream in the central portion inside said inner tube and an ascending stream in the peripheral portion outside said inner tube.

3. The process according to claim 1, wherein said agitator is rotated so as to generated an ascending stream in the central portion inside said inner tube and a descending stream in the peripheral portion outside said inner tube.

4. The process according to claim 1, wherein the uranium concentration in the uranous solution introduced into said fluorination precipitation tank is adjusted to at least 100 g/l.

5. The process according to claim 1, wherein a residence time in said tank of the uranous solution and the hydrofluoric acid solution introduced into said fluorination precipitation tank and the produced uranium tetrafluoride crystals is adjusted to 0.5 to 3 hours.

* * * * *